May 27, 1930.  C. ARNDT  1,760,229
SEPARATOR TO CLARIFY WASTE WATERS
Filed Aug. 28, 1929    2 Sheets-Sheet 1
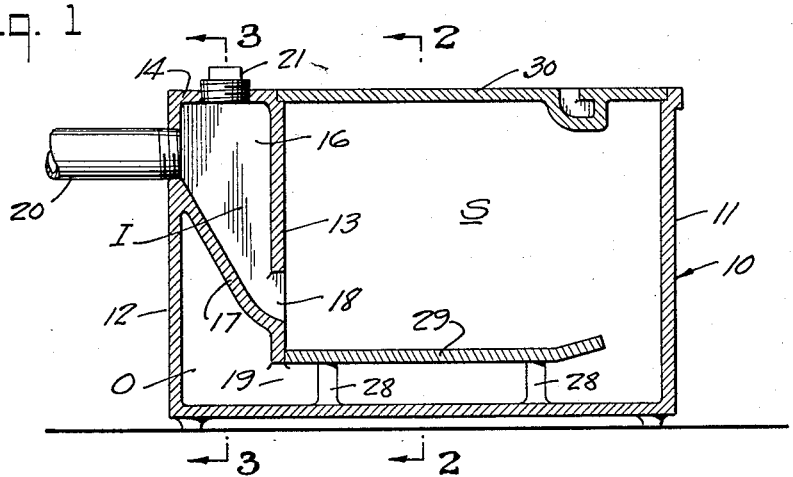
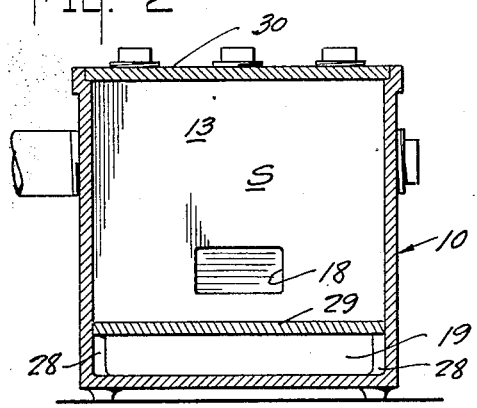
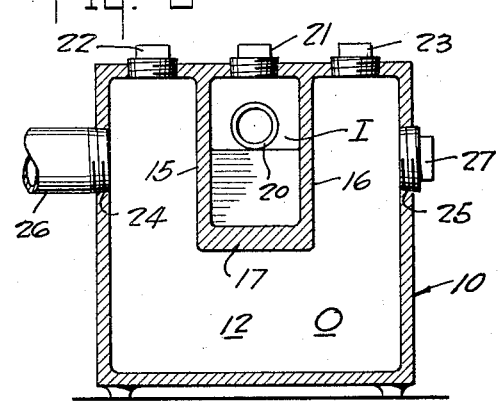
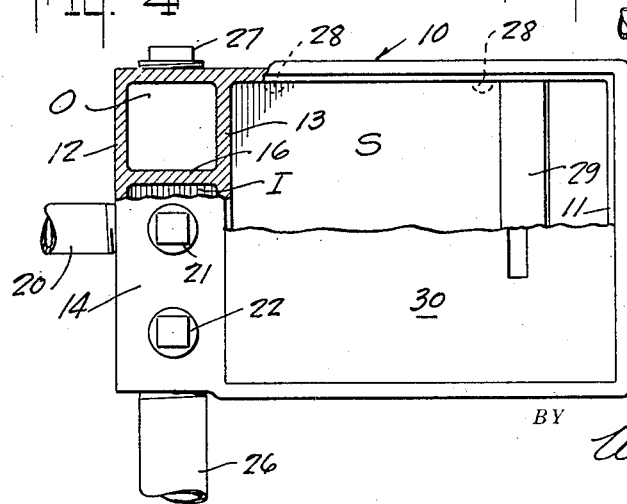
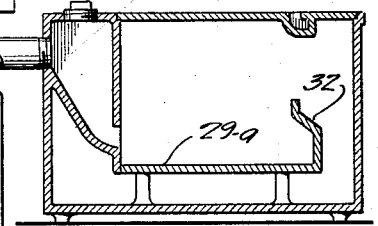
INVENTOR
Charles Arndt
BY Westall and Wallace
ATTORNEYS May 27, 1930. C. ARNDT 1,760,229
SEPARATOR TO CLARIFY WASTE WATERS
Filed Aug. 28, 1929   2 Sheets-Sheet 2
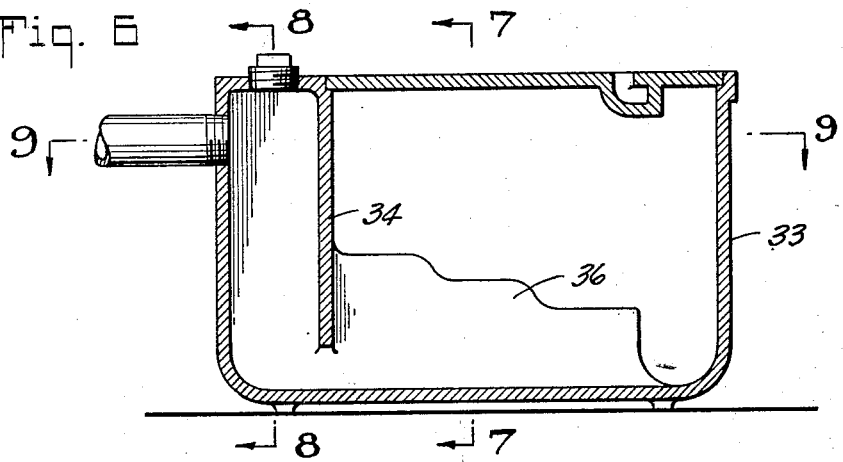
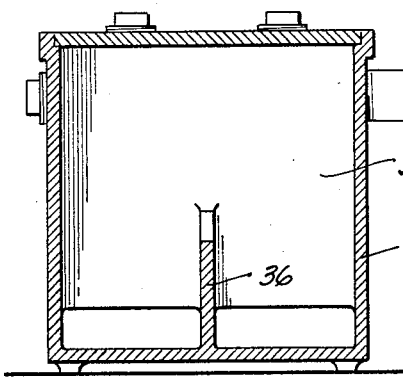
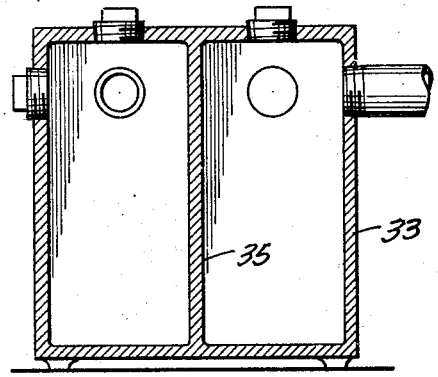
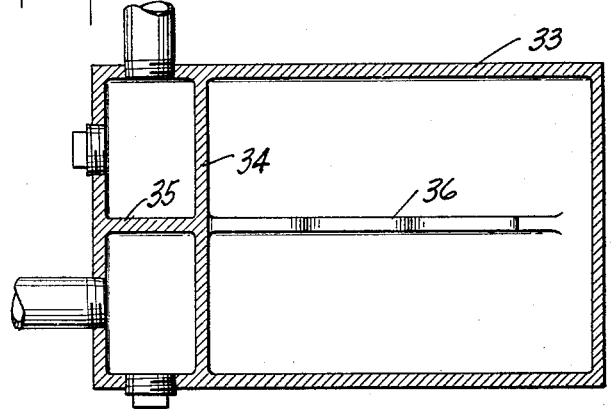
INVENTOR
Charles Arndt
BY
Westall and Wallace
ATTORNEYS Patented May 27, 1930

1,760,229

UNITED STATES PATENT OFFICE

CHARLES ARNDT, OF LOS ANGELES, CALIFORNIA

SEPARATOR TO CLARIFY WASTE WATERS

Application filed August 28, 1929. Serial No. 388,930.

This invention relates to a separator which is adapted to separate fluent materials of different specific gravities, such as liquids and solids or liquids of different densities. Broadly it comprises a separating chamber and a channel for directing the flow of waste waters through the separating chamber.

Separators of the character above mentioned are commonly used in drains from kitchens, laboratories and the like where foreign matter separable from the waste water is present. Such matter, if allowed to flow into the pipes leading to sewers, will cause clogging of the latter. Separators are installed to enable extraction of the foreign matter, especially grease or oil. However, such foreign matter accumulates in the separator and must be removed therefrom frequently or the separator ceases to function. Installation of such separators is at times difficult unless the inlets and outlets are convenient. Otherwise fittings involving a multiplicity of bends and turns must be employed. Such bends tend to accumulate the foreign matter and clog. They are also expensive, require time and labor for installation and result in a cumbersome installation.

The objects of this invention are to provide a separator having any or all of the following features; a compact structure having inlets and outlets disposed adjacent one another to permit close coupling to the drain system; a separator having an inlet and outlet at one end of a chamber, the outlet being arranged so that it may be either connected right hand or left hand with respect to the separator body; a separator of simple structure easy to clean and remove the retained and separated foreign substances; and a separator having a return flow channel.

These objects together with other objects and corresponding accomplishments are obtained by means of the embodiments of my invention illustrated in the accompanying drawings, in which:—

Fig. 1 is a vertical section through one embodiment of the invention; Figs. 2 and 3 are sections as seen on the lines correspondingly numbered in Fig. 1; Fig. 4 is a plan view of the structure shown in Figs. 1, 2 and 3 with a portion of the cover broken away and another part in section; Fig. 5 is a vertical section of a modified form of the structure shown in Fig. 1; Fig. 6 is a vertical section of another embodiment of the invention; Figs. 7, 8 and 9 are sections as seen on the lines correspondingly numbered in Fig. 6.

Referring more particularly to Figs. 1 to 4, inclusive, a basin or receptacle is marked 10. The receptacle has end walls 11 and 12, and adjacent the end wall 12 is an upright wall 13 ending short of the bottom of the basin. The upright wall divides the basin into a separation chamber S and an inlet and outlet space. The inlet and outlet space is covered by a wall 14. Extending transversely across the space is a partition comprising side walls 15 and 16 and an inclined bottom wall 17. The partition divides the space into an inlet chamber I and an outlet chamber O. The outlet chamber embraces the inlet chamber. An opening 18 in the upright wall 13 serves for communication of the inlet chamber and the separation chamber. The outlet chamber communicates with the separation chamber through the opening 19 formed between the lower edge of the upright wall and the bottom of the basin. A tapped opening in the end wall 12 provides for connection of an inlet pipe marked 20. In the top wall 14 is a threaded clean-out opening adapted to be closed by a plug 21. This clean-out opening may in some instances serve for connection thereto of an inlet pipe instead of connecting such pipe 20 in the end wall. There are also two tapped openings communicating with the outlet chamber forming clean-out openings and closed by plugs 22 and 23. These clean-out openings may also serve for pipe connections if desired. In the side walls of the basin are tapped openings 24 and 25 communicating with the outlet chamber providing right and left hand openings for connection thereto of an outlet pipe marked 26. The opening not used may be closed by a plug 27. It will thus be seen that either a right or left hand connection may be made for the outlet pipe.

In the separation chamber are supporting lugs 28 which may be cast on the side walls of the basin. Mounted upon the lugs is a false bottom 29 in such a manner that it is removable. The false bottom divides the separation chamber into a return bend channel for the waste waters. Such water will enter the separation chamber from the inlet chamber I and due to the large volume of the chamber above the false bottom or baffle plate 29, a quiescent zone is provided. Due to the quiescence in the upper part of the separation chamber, those ingredients of less density will rise to the surface of the water, such as grease or oil. The particles of heavier weight or greater density will settle and lodge on the plate 29. The clarified waste water then returns below the baffle to the outlet chamber. As the separator must be cleaned frequently, a cover 30 which rests in a recess is provided. To aid in lifting the cover, I have provided a hand hold 31. The particular separator shown in Figs. 1 to 4, is adaptable especially for the separation of grease from waste water. It is obvious that the separator may be easily cleaned by lifting the cover 30 and scooping or dipping the grease or oil from the surface. The plate 29 is also easily cleaned of solid particles, by lifting the plate from its position upon the supporing lugs.

It may be desirable to provide a separator for catching solids such as plaster, the waste waters of hospitals often carrying such particles. In Fig. 5, I have shown such a construction which is substantially the same as that heretofore described, but it is provided with a bottom plate 29ᵃ having at the end a dam 32 so as to prevent the particles which have settled thereon from passing over into the channel below the plate 29ᵃ. The operation is substantially the same as that of the separator shown in Figs. 1 to 4, but it is adapted for receiving a larger amount of dense solid particles because of the nature of the plate 29ᵃ.

Referring to Figs. 6 to 9 inclusive, another embodiment of my invention is disclosed, wherein a basin 33 has an upright wall 34 ending short of the bottom of the basin. A partition wall 35 divides the space at the inlet and outlet ends into two chambers, which may be interchangeably used as inlets and outlets. Extending into the separation chamber is a plate 36 ending short of the end of the separation chamber and having a crest decreasing in height from the upright wall 34 to its other end. The plate 36 defines a return flow channel from an inlet to an outlet chamber. Tapped openings are provided in the side walls to communicate with the inlet and outlet chambers, one of the openings may be used for a pipe connection and the other plugged as shown in the drawings. There are also tapped openings in the end wall suitable for receiving pipes for being plugged. It is obvious that right and left hand connections for inlets and outlets may be made either into the side walls or into the end walls or both as desired.

In the operation of the separators shown in Figs. 7 to 9, the waste fluid enters a chamber at one side then passes into the separation chamber where the quiescence is sufficient to permit grease or liquid of less specific gravity to rise, the clarified water passing around the plate to the other or outlet chamber. It is obvious that the basin may be connected to reverse the flow.

In the construction shown, a separator is provided such that a close coupling may be made to the inlet and outlet pipes and with a maximum of selection. The ease of cleaning is obvious. One fault of many grease traps and separators has been that they are difficult of access for cleaning and the tendency is not to clean the separator as often as required. The final result is that some of the detrimental ingredients are carried away with the effluents.

What I claim is:—

1. A separator to clarify waste waters comprising a basin, an upright wall paralleling and adjacent one end wall of said basin, a transverse wall between said upright wall and said end wall to form inlet and outlet chambers, said upright wall having openings adjacent the lower portion placing said inlet and outlet chambers in communication with the remaining chamber in said basin, which remaining chamber forms a separation chamber, a plate extending from said upright wall toward and short of the wall opposite said end wall to form a return flow channel, said channel being in free communication with the upper part of said separation chamber.

2. A separator to clarify waste waters comprising a basin, an upright wall paralleling and adjacent one end wall of said basin, a transverse wall between said upright wall and said end wall to form inlet and outlet chambers, said upright wall having openings adjacent the lower portion placing said inlet and outlet chambers in communication with the remaining chamber in said basin, which remaining chamber forms a separation chamber, the inlet opening being disposed at a higher level than the outlet opening, a plate extending from said upright wall toward and short of the wall opposite said end wall to form a return flow channel, from said inlet opening to said outlet opening, said channel being in free communication with the upper part of said separation chamber, said plate paralleling the bottom wall of said basin and being detachably mounted in said basin.

3. A separator to clarify waste waters comprising a basin, an upright wall paralleling and adjacent one end wall of said basin, a transverse wall between said upright wall and said end wall to form inlet and outlet chambers, said upright wall having openings adjacent the lower portion placing said inlet and outlet chambers in communication with the remaining chamber in said basin, which remaining chamber forms a separation chamber, the inlet opening being disposed at a higher level than the outlet opening, a plate extending from said upright wall toward and short of the wall opposite said end wall to form a return flow channel, from said inlet opening to said outlet opening, said channel being in free communication with the upper part of said separation chamber, said basin having lugs on its walls and said plate detachably resting on said lugs so as to parallel the bottom wall of said basin.

4. A separator for clarifying waste waters comprising a basin, an upright wall paralleling and adjacent one end wall of said basin to form an inlet and outlet space, a transverse wall in said space intermediate the side walls of said basin defining an inlet chamber with an opening through said upright wall to a separation chamber in said basin beyond said space, the inlet opening to said separation chamber being disposed above the bottom wall of said basin, the remaining portion of said space forming an outlet chamber with an opening through said upright wall to said separation chamber below the inlet opening, a plate disposed in said separation chamber to parallel the bottom of said basin extending from said upright wall to a point short of the opposite end wall of said basin and forming therein a return flow channel between said openings.

5. A separator for clarifying waste waters comprising a basin, an upright wall paralleling and adjacent one end wall of said basin, to form an inlet and outlet space, a transverse wall in said space intermediate the side walls of said basin defining an inlet chamber with an opening through said upright wall to a separation chamber in said basin beyond said space, the inlet opening to said separation chamber being disposed above the bottom wall of said basin, the remaining portion of said space forming an outlet chamber with an opening through said upright wall to said separation chamber below the inlet opening, supporting lugs in said basin, a plate disposed in said separation chamber and detachably mounted on said lugs to parallel the bottom of said basin extending from said upright wall to a point short of the opposite end wall of said basin and forming therein a return flow channel between said openings.

6. A separator for clarifying waste waters comprising a basin, an upright wall paralleling and adjacent one end wall of said basin, to form an inlet and outlet space, a transverse wall in said space intermediate the side walls of said basin defining an inlet chamber with an opening through said upright wall to a separation chamber in said basin beyond said space, the inlet opening to said separation chamber being disposed above the bottom wall of said basin, the remaining portion of said space forming an outlet chamber with an opening through said upright wall to said separation chamber below the inlet opening, supporting lugs in said basin, a plate disposed in said separation chamber and detachably mounted on said lugs to parallel the bottom of said basin extending from said upright wall to a point short of the opposite end wall of said basin and forming therein a return flow channel between said openings, a detachable cover on said basin coextensive with said separation chamber.

In witness that I claim the foregoing I have hereunto subscribed my name this 19th day of August, 1929.

CHARLES ARNDT.